United States Patent [19]

Shelhart et al.

[11] Patent Number: 5,375,418

[45] Date of Patent: Dec. 27, 1994

[54] CONTROLLED CONVERTIBLE TOP HYDRAULIC LOCK

[75] Inventors: Robert E. Shelhart, Brentwood, Tenn.; Carl J. Klug, Brooklyn Park, Minn.

[73] Assignee: Wickes Manufacturing Company, Charlotte, N.C.

[21] Appl. No.: 136,813

[22] Filed: Oct. 18, 1993

Related U.S. Application Data

[63] Continuation-in-part of Ser. No. 873,396, Apr. 24, 1992, Pat. No. 5,279,119, which is a continuation-in-part of Ser. No. 659,642, Feb. 25, 1991, abandoned.

[51] Int. Cl.$^5$ ............................................. F16D 31/02
[52] U.S. Cl. ............................................. 60/394; 60/474; 91/420
[58] Field of Search .................. 60/401, 394, 473, 474, 60/476; 91/420; 296/117

[56] References Cited

U.S. PATENT DOCUMENTS

| | | | |
|---|---|---|---|
| 1,144,758 | 6/1915 | Desmond | 137/868 |
| 2,274,668 | 3/1942 | Crawford et al. | 296/117 |
| 2,433,918 | 1/1948 | Mefferd | 417/440 |
| 2,467,509 | 4/1949 | Trautman | 91/420 |
| 2,483,312 | 9/1949 | Clay | 91/420 |
| 2,588,520 | 3/1952 | Halgren et al. | 91/420 |
| 2,648,346 | 8/1953 | Deardorff et al. | 91/420 |
| 2,657,533 | 11/1953 | Schanzlin et al. | 60/468 |
| 2,778,378 | 1/1957 | Presnell | 91/420 |
| 2,916,879 | 12/1959 | Gondek | 91/420 |
| 2,959,190 | 11/1960 | Barnes et al. | 91/420 |
| 3,106,064 | 10/1963 | McLeod | 296/117 |
| 3,312,058 | 4/1967 | Shelhart | 296/117 |
| 3,344,555 | 10/1967 | Hugle | 60/476 |
| 3,412,685 | 11/1968 | Connelly | 417/440 |
| 3,443,834 | 5/1969 | Andres | 296/121 |
| 3,468,126 | 9/1969 | Mercier | 91/420 |
| 3,576,192 | 4/1971 | Wood et al. | 91/420 |
| 3,584,912 | 6/1971 | Leger | 296/117 |
| 4,030,520 | 6/1977 | Sands | 137/517 |
| 4,291,718 | 9/1981 | Sanin et al. | 91/420 |
| 4,361,075 | 11/1982 | Block | 91/420 |
| 4,741,571 | 5/1988 | Godette | 296/107 |
| 4,948,194 | 8/1990 | Dogliani | 296/108 |
| 4,969,388 | 11/1990 | Kolhoff et al. | 296/117 |
| 5,067,768 | 11/1991 | Fischbach | 296/107 |

FOREIGN PATENT DOCUMENTS

| | | | |
|---|---|---|---|
| 1014296 | 8/1952 | France | 137/864 |
| 1256383 | 12/1967 | Germany | 91/420 |
| 2246532 | 4/1974 | Germany | 91/420 |
| 2626611 | 12/1977 | Germany | 91/420 |
| 2716694 | 10/1978 | Germany | 91/420 |
| 0097502 | 7/1980 | Japan | 91/420 |
| 0138502 | 10/1981 | Japan | 91/420 |
| 0107405 | 7/1982 | Japan | 91/420 |
| 7309231 | 7/1973 | Netherlands | 91/420 |
| 595547 | 3/1978 | U.S.S.R. | 91/420 |
| 985473 | 12/1982 | U.S.S.R. | 91/420 |

*Primary Examiner*—Edward K. Look
*Assistant Examiner*—F. Daniel Lopez
*Attorney, Agent, or Firm*—David A. Greenlee

[57] ABSTRACT

A vehicle convertible top is moved by hydraulic cylinders between extreme raised and lowered positions. The cylinder ends are connected to ports in a reversible hydraulic pump in one end of an elongated housing, which has a reservoir in the other end, separated by a pump cap. The pump cap houses two fluid circuits connecting the pump to the ends of the cylinders. Each circuit has an end of cycle hydraulic locking device comprising a normally-closed valve and a valve actuator. The circuit valves are alternately opened by pump pressure to pressurize one end of the cylinders to alternately raise and lower the top. The opened valve closes when the pump ceases operation, preventing fluid backflow through the one circuit to the pump. This hydraulically locks the top in extreme raised and lowered positions to facilitate top latching and tonneau installation. A groove in the valve seat forms a leakage path which bypasses the closed valve to slowly reduce hydraulic pressure in the actuator at a predetermined rate until pressure is relieved after a predetermined period of time sufficient to accomplish top latching or tonneau installation. A manually-operated pump bypass in the pump cap vents both circuits to the reservoir to enable manual top operation when the pump is inoperative. The pump cap includes makeup valving for accommodating the displacement differential in the cylinder.

17 Claims, 5 Drawing Sheets

CONTROLLED CONVERTIBLE TOP HYDRAULIC LOCK

This is a continuation-in-part of U.S. Ser. No. 07/873,396, filed Apr. 24, 1992 now U.S. Pat. No. 5,279,119, which is a continuation-in-part of U.S. Ser. No. 07/659,642, filed Feb. 25, 1991, now abandoned.

FIELD OF THE INVENTION

This invention relates generally to a hydraulic power system for a vehicle convertible top and, more specifically, to an end of cycle locking device for such a hydraulic power system.

BACKGROUND OF THE INVENTION

Passenger vehicles having convertible tops that can be raised to cover the passenger compartment and lowered to open the compartment predate the closed sedan type of vehicle and have been manufactured for many years. Recently, vehicles having convertible tops have become more popular with purchasers because of their ability to quickly convert from a closed vehicle to an open roadster by lowering the top. Consequently, automobile manufacturers are manufacturing a greater variety of these sporty vehicles.

The usual convertible top comprises an articulated top frame that supports a fabric cover. The frame includes a plurality of spaced transverse bows interconnecting articulated side rails that support the fabric cover. The rear of the cover is attached to the vehicle body or, in some cases, to a movable rear bow, as illustrated in U.S. Pat. No. 5,067,768 to Roderick C. Fischbach and assigned to the assignee herein. The front edge of the cover is attached to the front bow, called the top header.

The top header engages the top of the vehicle windshield frame, or windshield header, in top raised position. Header latches, such as shown in U.S. Pat. 4,741,571 to Godette, clamp the headers together and compress a seal between them. Upon releasing the latching mechanism, the top is folded and lowered into a well located behind the passenger compartment. This action may be accomplished manually or by a power operator, usually a pair of hydraulic cylinders.

The top is raised by reversing this procedure, with switch actuation causing the hydraulic cylinders to raise and unfold the top until the top header is in close proximity to the windshield header. The latches are then manually engaged and operated to compress the seal and secure the headers together. One requirement of all convertible vehicles is that the top cover fit snugly on the frame so as to present a smooth, sleek appearance. This snug fit also reduces the vehicle's coefficient of drag, which affects gasoline mileage—a critical vehicle attribute. A snug fit is accomplished by stretching the cover taut over the frame. Cover stretching occurs at the end of the top raising cycle by fully extending the top frame and operating the header latches.

In a power-operated top, a switch is manually operated to actuate the power operator to raise the top. When a power-operated top is fully raised, the fabric cover is stretched when the hydraulic cylinders fully extend the frame linkage to move the top header into close proximity to the windshield header at the end of the cycle. When the power operator is turned off by releasing the manual actuation switch, hydraulic pressure quickly diminishes in the cylinders and the top "springs back" as the stretched fabric contracts, moving the headers apart. The top header must then be manually forced down onto the windshield header to enable the latches to be engaged and closed. Since this action again stretches the fabric cover, it requires a significant amount of manual effort.

This problem is exacerbated during cooler weather when the top fabric stiffens, requiring increased effort to manually stretch the cover fabric to engage the headers, followed by added effort to close the latches. The added manual effort required to accomplish top latching can be quite aggravating to the vehicle owner.

Although power latches have been devised, they are expensive and complex. Consequently, most convertible tops feature manual latches, the operation of which are plagued by the problem described above.

As a styling feature, it is desirable to have the top stored invisibly. Thus the top must store as fully within the well as possible. It is also desirable to store the top in as little space as possible, since the well volume subtracts from the vehicle's luggage capacity. As a result, the well is minimally dimensioned and the top is designed to fold into a compact package, with the tonneau fitting tightly over the stored top.

When the top is lowered, the power operator compresses the linkage and the folded fabric cover. When the power is turned off upon release of the switch, the top will "spring up" due to the elasticity of the top linkage and cover. This necessitates the use of additional manual effort to recompress the top and install the tonneau over the stored top. This problem is also exacerbated by cold weather, when the fabric cover stiffens.

It is quite desirable to reduce the manual effort required to latch a convertible top header to a windshield header.

It is also desirable to reduce the effort required to install a tonneau over a stored convertible top.

SUMMARY OF THE INVENTION

It is therefore an object of this invention to reduce the amount of manual effort required to latch a convertible top header to a windshield header.

It is another object of this invention to reduce the amount of manual effort required to install a tonneau over a stored convertible top.

It is a further object of this invention to provide a hydraulic power operator for a convertible top that incorporates an end of cycle hydraulic lock which maintains the top in extreme raised position to reduce the amount of manual effort required to latch the top header to the windshield header and in extreme lowered position to facilitate installation of the tonneau.

It is a yet further object of this invention to provide a control for releasing the hydraulic lock after a predetermined period of time.

It is a still further object of this invention to provide such an end of cycle lock that incorporates means for releasing the hydraulic lock to enable manual movement of the top in the event of a power failure.

In one aspect, this invention features a convertible top operating means which comprises a hydraulic actuator for moving the convertible top between extreme raised and lowered positions and having a pair of fluid translating ports, a hydraulic fluid source including a motor-operated reversible hydraulic pump, and circuitry connecting the pump to both actuator ports and valving for directing hydraulic fluid to one actuator port to pressurize the actuator to raise the top and to the other actuator port to pressurize the actuator to lower the top. The valving includes means for maintaining hydraulic pressure in the actuator to hydraulically lock the top in one extreme position, and control means for relieving the hydraulic pressure in the actuator to unlock the top after a predetermined period of time.

Preferably, the valving includes a valve having a valving member such as a ball valve seatable on a seat to prevent backflow of hydraulic fluid from the actuator to the pump to maintain the hydraulic pressure in the actuator and maintain the top in the one extreme position, and the control means comprises a bypass passage, such as a groove in the valve seat, which bypasses the valve to allow the backflow of hydraulic fluid from the actuator to the pump at a predetermined rate to relieve hydraulic pressure in the actuator after a predetermined period of time.

In a preferred embodiment, duplicate valving is provided in the other circuit and the valve seat grooves are sized to relieve actuator hydraulic pressure in approximately one minute.

In another embodiment the valve seat grooves are differently sized to allow backflow of hydraulic fluid from the actuator at different rates for each extreme top position.

In another aspect, this invention features a vehicle having a convertible top, a hydraulic cylinder for moving the convertible top between extreme raised and lowered positions and having a pair of fluid translating ports, a hydraulic fluid reservoir, and a motor-driven reversible hydraulic pump connected to the reservoir during operation and having a first fluid translating circuit connected to a cylinder port for driving the cylinder to raise the top and a second fluid translating circuit connected to the other cylinder port for driving the cylinder to lower the top. An end of cycle locking device comprises a normally-closed first circuit valve in the first circuit that is opened by pressure fluid from the pump to enable outflow of pressure fluid to the cylinder through the first circuit during pump operation in one direction, wherein the valve closes when the pump ceases operation, thus preventing the backflow of fluid through the first circuit to the pump which locks the top in extreme raised position. A first leakage bypass is provided across the first circuit valve for permitting the controlled backflow of hydraulic fluid at a predetermined rate from the actuator to the pump to relieve actuator hydraulic pressure to unlock the top after a predetermined period of time. A valve actuator for the first circuit valve is operable in response to pressure fluid in the second circuit during pump operation in the other direction to open the first circuit valve to enable the free return flow of pressure fluid through the first circuit. A second normally-closed circuit valve in the second circuit is opened by pressure fluid from the pump to enable outflow of pressure fluid to the cylinder in the second circuit during pump operation in the other direction. The second circuit valve closes when the pump ceases operation, thus preventing the backflow of fluid to the pump through the second circuit to hydraulically lock the top in extreme lowered position. A second leakage bypass is provided across the second circuit valve for permitting the controlled backflow flow of hydraulic fluid at a predetermined rate from the actuator to the pump to relieve actuator hydraulic pressure to unlock the top after a predetermined period of time. The second circuit valve has a valve actuator operable in response to pressure fluid in the first circuit during pump operation in the one direction to open the valve to enable the free return flow of pressure fluid in the second circuit. A third bypass includes a normally-closed bypass valve connecting each circuit to the reservoir. A manual actuator is provided for opening the bypass valves to permit fluid flow from the second circuit to the reservoir to unlock the top in either extreme position to enable manual movement of the top when the pump is not operating.

These and further features of this invention will become more readily apparent upon reference to the following detailed description and the attached drawings, in which:

DETAILED DESCRIPTION OF THE INVENTION

Figure 1:
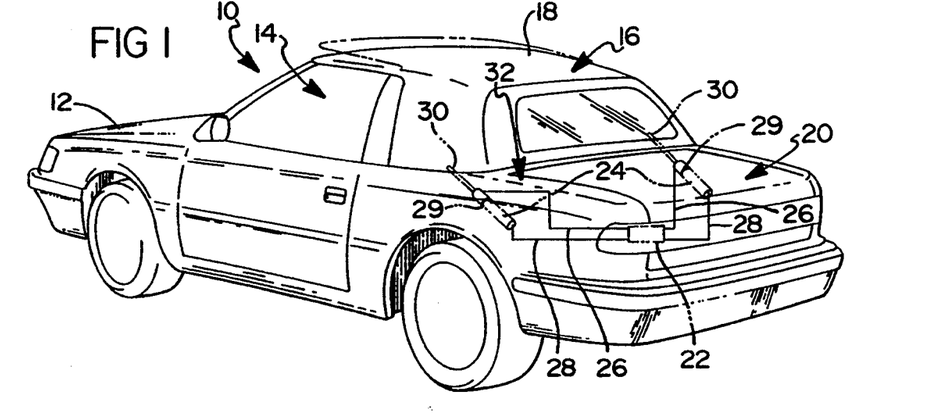
FIG. 1 is a perspective view of a passenger vehicle having a convertible top operated by a hydraulic system according to this invention, with the hydraulic system including a pumping unit shown schematically in phantom lines, and the top shown fully raised prior to latching in phantom lines and after latching in solid lines.

Referring now to FIG. 1 of the drawings, a passenger vehicle 10 has a body 12 that includes a passenger compartment 14 that is enclosed by a convertible top 16. The vehicle illustrated is disclosed in greater detail in U.S. Pat. No. 5,067,768 to Roderick C. Fischbach, and assigned to the assignee herein, the disclosure of which is incorporated herein by reference. Convertible top 16 comprises an articulated frame structure (not shown here, but fully disclosed in the Fischbach patent) that supports a fabric cover 18.

Top 16 is illustrated in its raised position and may be selectively lowered by operation of a hydraulic power system 20, shown schematically in phantom lines. Power system 20 comprises a reversible hydraulic pump unit 22 which is connected to a pair of identical hydraulic cylinders 24 by hydraulic fluid translating lines 26, 28. Each cylinder 24 has a piston 29 connected to a reciprocable output rod 30.

The linkage operatively connecting the cylinder rods 30 to the articulated frame is fully described in the Fischbach patent. Pump unit 22 may be selectively operated by manual actuation of a control switch 23, that is conventionally mounted in passenger compartment 14, to operate cylinders 24 to retract their rods 30 to raise top 16, or to extend rods 30 to lower the top.

In the lowered position, top 16 is folded to lie completely within a well 32 located behind passenger compartment 14 in vehicle body 12. The detailed operation of the top is set forth in greater detail in the Fischbach patent.

Figure 2:
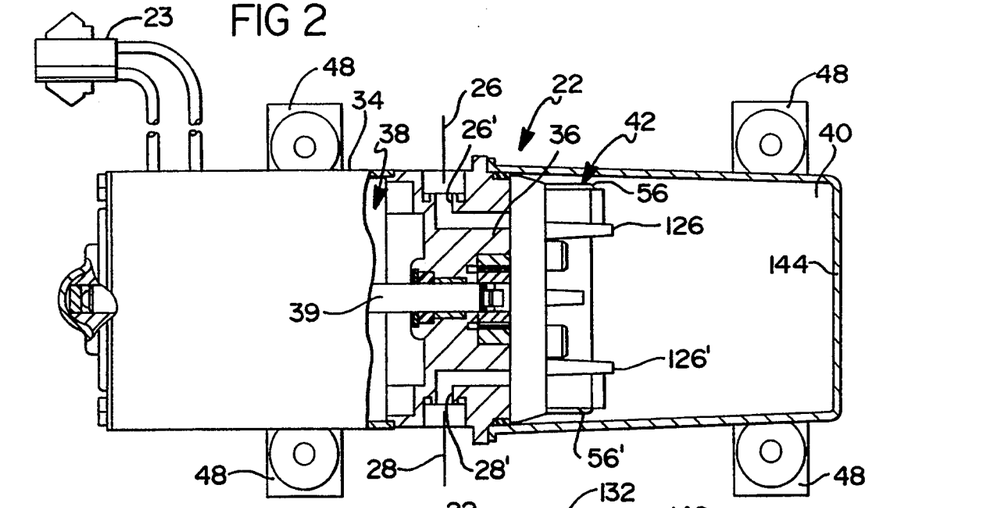
FIG. 2 is a plan view of the hydraulic pumping unit of FIG. 1, which incorporates a pump cap which incorporates a hydraulic circuit locking device, according to this invention, and is partially broken-away.
Figure 3:
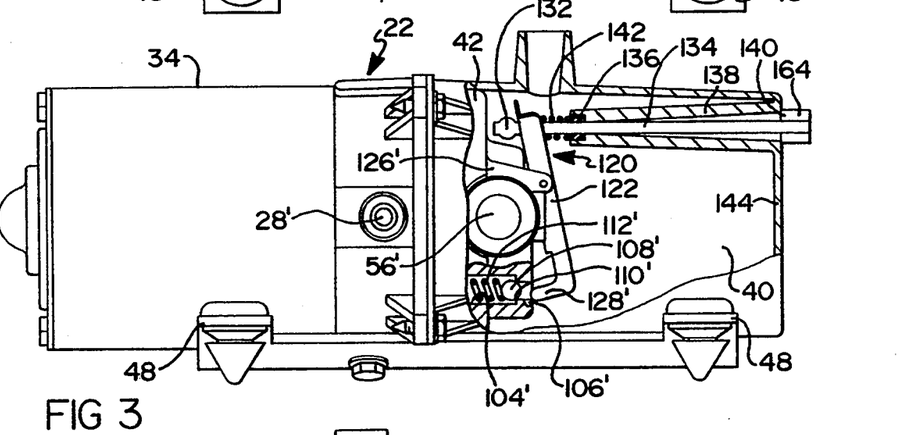
FIG. 3 is a side view of the hydraulic pumping unit of FIG. 2, also partially broken-away.
Figure 4:
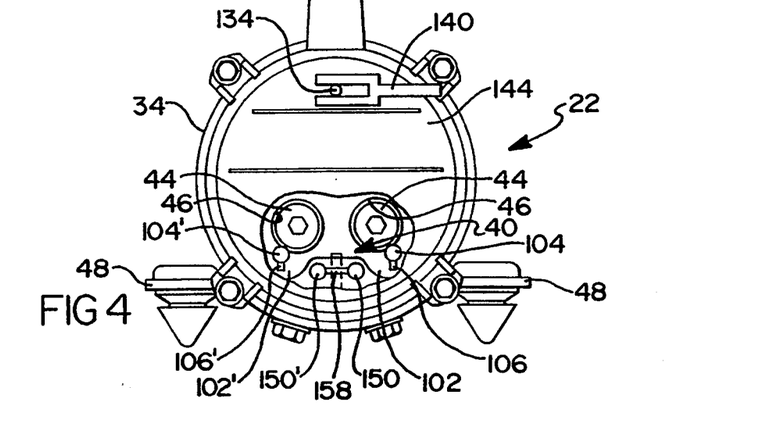
FIG. 4 is an end view of the pumping unit of FIG. 2, also partially broken-away.

Power system 20 is depicted in greater detail in FIGS. 2–4. Pump unit 22 comprises a housing 34 which incorporates a reversible hydraulic pump 36 in one end. Pump 36 is preferably a gerotor pump which translates hydraulic fluid to/from cylinders 24 through passages 26', 28' which connect to lines 26, 28. Pump 36 is driven by a conventional reversible electric motor 38 through a shaft 39, as controlled by switch 23.

In its other end, housing 34 incorporates a hydraulic fluid reservoir 40 which connects to pump 36 during operation to supply makeup fluid or receive excess fluid as required. A pump cover 42 is secured to and closes the end of pump 36 via bolts 44 extending through mounting holes 46 to isolate it from reservoir 40. Four mounting pads 48 are provided on housing 34 for mounting the pump unit 22 at an appropriate location within vehicle 10, preferably beneath well 32.

The structure of the end-of-cycle hydraulic lock feature of this invention will now be described with reference to FIGS. 5–7. Pump cover 42 comprises a generally cylindrical passage portion 50 and a valving portion 52. Valving portion 52 includes a stepped cylindrical bore 54 that is closed at either end by a pair of end caps 56, 56'. External ports 60, 60' connect passages 26', 28' to the enlarged end chambers 62, 62', respectively, of bore 54.

A pair of identical inserts 64, 64' are inserted into end chambers 62, 62' to abutment with shoulders 66, 66' which define a smaller stepped central section 68 of bore 54. The inserts 64, 64' comprise bodies 70, 70' having stepped bores formed of respective segments 72, 74, 76 and 72', 74', 76'.

Conical valve seats 78, 78' connect segments 72 and 74, and 72' and 74'. Ball valving elements 80, 80' are biased into sealing contact with seats 78, 78' by compression springs 82, 82', which together form ball-type circuit valves. Valve seats 78, 78' include leakage bypass passages in the form of grooves 83, 83', whose function and formation will be later described.

Insert segments 76, 76' have the same diameter as, and form an extension of, central section 68 of bore 54. Inserts 64, 64' have radial ports 84, 84' which connect the extended bore 76-68-76' with passages 86, 86' in body passage portion 50. Passages 86, 86' connect to pump 36 through kidney-shaped ports 88, 88'.

Figure 9:
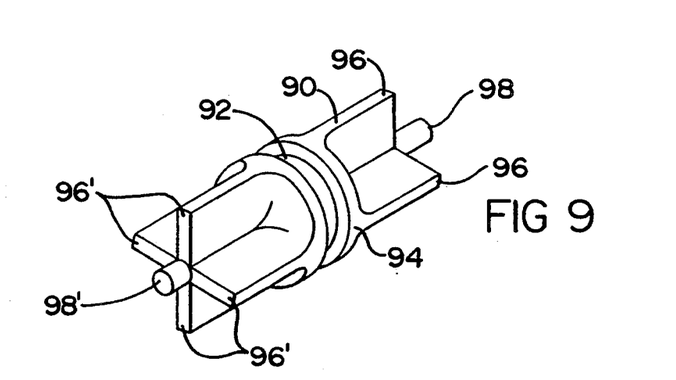
FIG. 9 is a perspective view of the valve actuator shown in FIGS. 7 and 8.

A valve actuator 90 is located in the extended bore 76-68-76'. As best seen in FIG. 9, actuator 90 has a double-ended cruciform shape and is symmetrical about a central annular groove 92 formed in a cylindrical central section 94.

The ends of actuator 90 each comprise four identical, mutually perpendicular fins 96, 96' extending axially from central section 94. The fins 96, 96' radiate from central valve operators in the form of axially-extending pins 98, 98'. The radially outer surfaces of the fins 96, 96' form cylindrical extensions of central section 94.

Figure 7:
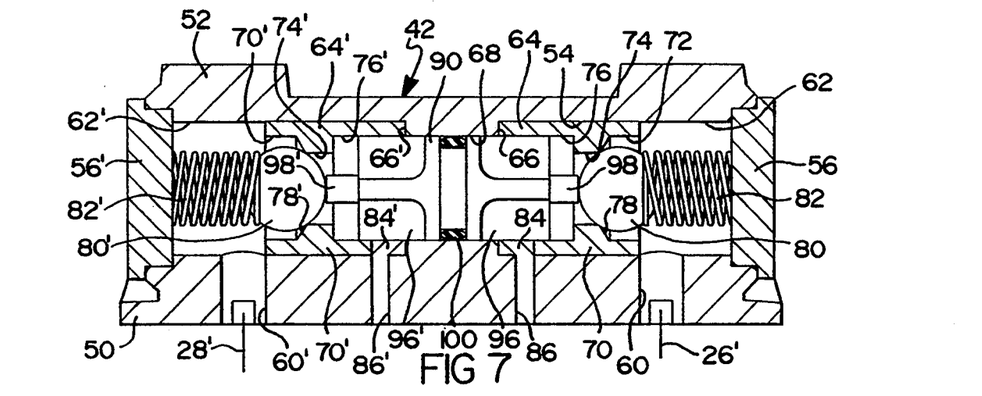
FIG. 7 is an enlarged sectional view of the pump cap of FIGS. 5 and 6, taken along the line 7—7 of FIG. 5, showing one embodiment of the hydraulic locking device of this invention.

An O-ring seal 100 is captured in groove 92 and serves to seal end chambers 62 and 62' from each other, as shown in FIG. 7. The open spaces between the fins 96, 96' enable free fluid communication between ports 60, 60' and respective valve seats 78, 78'. In the static state, illustrated in FIG. 7, valve actuator 90 is located centrally in bore 76-68-76' by the force of springs 82, 82' which seat balls 80, 80' that have minimal clearance with the pins 98, 98'.

The circuit valves 78-80 and 78'-80' are opened directly or indirectly by fluid pressure. Pressure fluid supplied through passage 86 and port 84 will directly move ball 80 from seat 78 against the force of spring 82. Simultaneously, this pressure will force actuator 90 leftward and pin 98' will unseat ball 80', thus opening the circuit valve in indirect response to fluid pressure.

Similarly, pressure fluid supplied through passage 86' and port 84' will directly move ball 80' from seat 78' against the force of spring 82'. Simultaneously, this pressure will force actuator 90 rightward and pin 98 will unseat ball 80, thus opening the circuit valve in indirect response to fluid pressure.

The structure 52 -100 just described comprises the end-of-cycle hydraulic lock feature of this invention. Its operation will be described in detail later.

FIGS. 3, 4, 5 and 6 illustrate the structure of the pump bypass valving feature of this invention. Pump cover passage portion 50 includes bosses 102, 102' which house passages 104, 104' which have keyhole-shaped entries 106, 106'. Passages 104, 104' contain ball valving elements 108, 108' which are biased against seats 110, 110' by springs 112, 112'.

Figure 6:
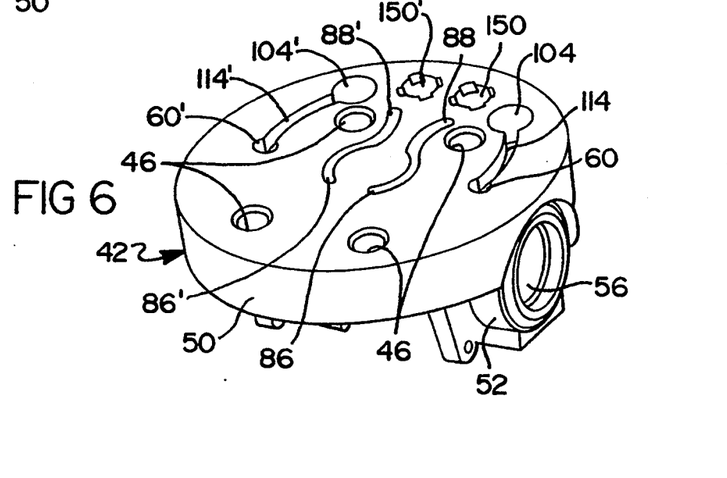
FIG. 6 is an enlarged bottom perspective view of the pump cap shown in FIG. 5.

Passages 104, 104' extend completely through pump cover 50, opening into respective arcuate passages 114, 114', as shown in FIG. 6. Passages 114, 114' connect to external pump ports 60, 60', which, in turn, are connected via passages 26', 28' to fluid translating lines 26, 28. This connects the cylinders 24 directly to reservoir 40 through bypass check valves comprising balls and seats 108, 110 and 108' 110' which are normally closed by springs 112 , 112 '.

Figure 5:
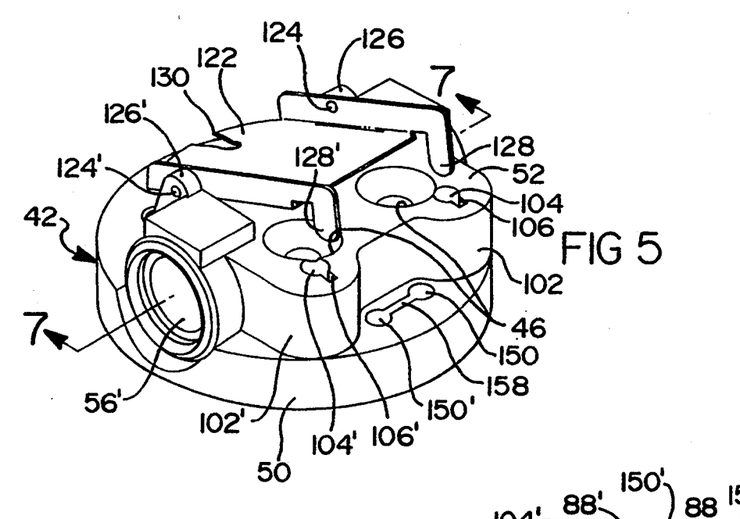
Fig. 5 is an enlarged top perspective view of the pump cap shown in FIGS. 2-4.

As shown in FIGS. 3 and 5, a manual operator 120 is provided to open bypass check valves comprising balls and seats 108, 110 and 108', 110'. Operator 120 comprises a flat plate 122 pivoted at 124, 124' to bosses 126, 126' on valving portion 52. At one end, plate 122 incorporates two fingers 128, 128' which are engageable with balls 108, 108' to open the check valves.

The other end of plate 122 includes a notch 130 which receives the end 132 of an operating rod 134. Rod 134 extends through a seal 136 and a tower support 138 externally of reservoir 40 where it is pivoted eccentrically to a lever 140. A spring 142 extends between the inner end of tower 138 and plate 122 to bias fingers 128, 128' to an inoperative position out of contact with balls 108, 108'.

Lever 140 normally lies flat against the outer surface of housing end 144, as shown in FIGS. 3 and 4. The lifting of lever 140 will reciprocate rod 134 outwardly of housing end 144, pivoting plate 122 upwardly against the force of spring 142. This will insert fingers 128, 128' through passage entries 106, 106' and into engagement with balls 108, 108' to open the check valves against the force of springs 112, 112'.

FIGS. 4, 5, 6 and 10 illustrate the structure of the makeup valving feature of this invention. Pump cover passage portion 50 includes a pair of through passages 150, 150' located between bosses 102, 102'. The passages contain ball valving elements 152, 152' and valve seats 154, 154'. A valve operator, or rocker, 156 is pivoted within a slot 158 adjacent passages 150, 150' and rocks between positions unseating ball 152, while allowing ball 152' to seat, and unseating ball 152' while allowing ball 152 to seat. This action alternately connects pump ports 88 and 88' to reservoir 40.

Since the fluid capacity of the rod end cylinder chamber 160 is smaller than that of head end chamber 162 by the volume occupied by rod 30, pump 36 requires makeup fluid to enable the cylinders 24 to extend. Conversely, to enable cylinders 24 to retract, excess fluid must be dumped. Rocker 156 responds to pump outlet hydraulic pressure on one of balls 152, 152', which seats the ball, by rocking and unseating the other ball. This opens the appropriate circuit to the reservoir 40 to automatically supply makeup fluid when needed or dump excess fluid when necessary, depending on the direction of the movement of the hydraulic cylinders by the pump.

Valve bypass passages 83, 83' in ball valve seats 78, 78' are best shown in FIGS. 11-14. These passages comprise a narrow, shallow groove formed on each valve seat. Upon operation of the hydraulic system to raise or lower top 16, balls 80 or 80' will seat, preventing backflow of hydraulic fluid. This locks the hydraulic system in full pressurized condition, with cylinders 24 fully extended or retracted. Bypass passages 83, 83' provide a path to bypass the ball valves and slowly leak hydraulic fluid to bleed down the hydraulic system pressure at a predetermined rate.

Figure 11:
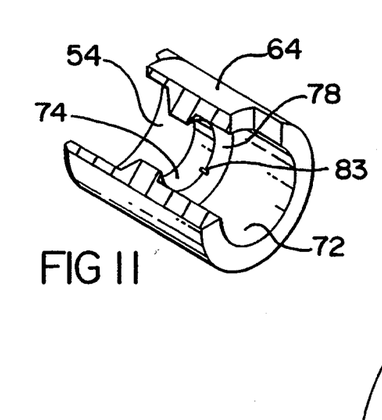
FIG. 11 is an enlarged perspective view of one the inserts shown in FIGS. 7 and 8.
Figure 12:
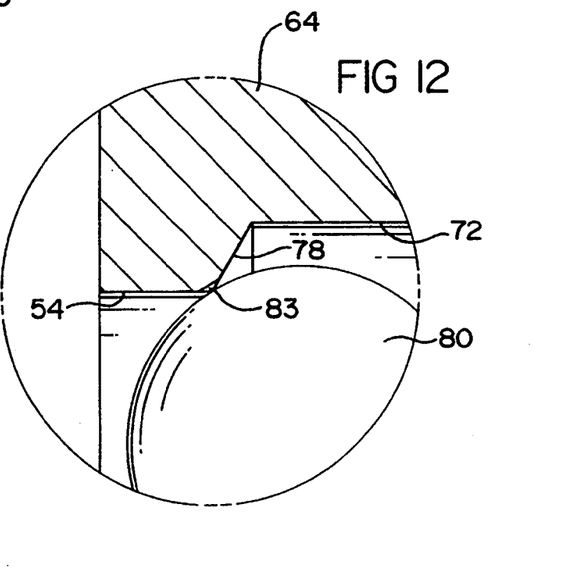
FIG. 12 is an enlarged detail view of the leakage bypass in the ball valve seat of the insert shown in FIG. 11.
Figure 13:
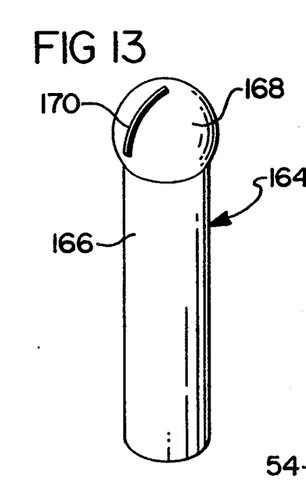
FIG. 13 is a perspective view of a tool for creating the leakage bypass in the ball valve seats.
Figure 14:
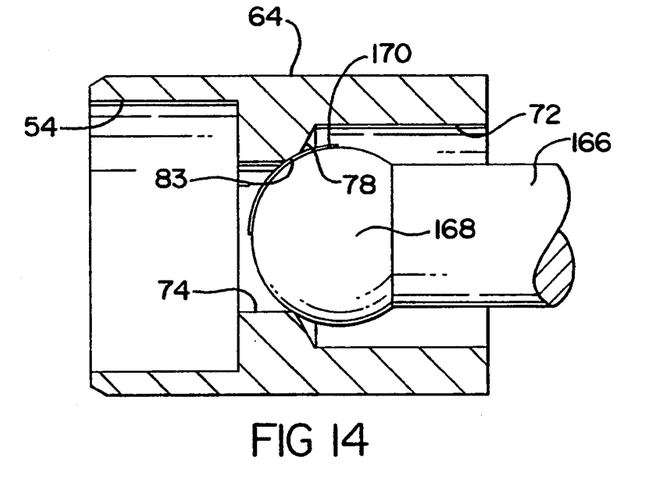
FIG. 14 is an enlarged view illustrating the formation of the leakage bypass in a ball valve seat by the tool.

Grooves 83, 83' are sized to leak hydraulic pressure to essentially zero after a predetermined period, of time which provides the vehicle driver with sufficient time to either latch a raised top, or to install the tonneau over a lowered top. A preferred period of time is one minute. The bleeddown rate is dependent of the depth and width of grooves 83, 83' and the pressure and volume of the hydraulic system. Groove size can easily be calculated for a particular hydraulic system by one skilled in the art. Different bleeddown rates and times may be used for the raised and lowered top positions, since on some convertibles, it will take longer to install the tonneau than to latch the top. This would dictate a larger size for groove 83 than for groove 83'.

FIGS. 11-14 depict the formation of groove 83 in insert 64. A tool 164 comprises a cylindrical shaft 166 which mounts a spherical head 168 having a forming shoulder 170. Shoulder 170 has a height and width equal to the depth and width of groove 83. Tool 164 is inserted into contact with valve seat 78 of insert 64. Force is applied to the end of shaft 166, driving shoulder 170 into the bottom of seat 78 to form groove 83. The rotational orientation of shoulder 170 is irrelevant, since groove 83 will function the same at all locations on seat 78, which is circular.

Groove 83' is similarly formed in insert 64' by the same tool 164 if the grooves are the same size. However, if the grooves are differently sized, a tool having a differently sized forming shoulder must be used.

Operation of the hydraulic system to raise and lower convertible top 16 will now be described, with reference to FIGS. 10a-10f. These drawing figures schematically represent the hydraulic system described above and are arranged to illustrate sequential operation to raise and lower top 16.

Figure 10A:
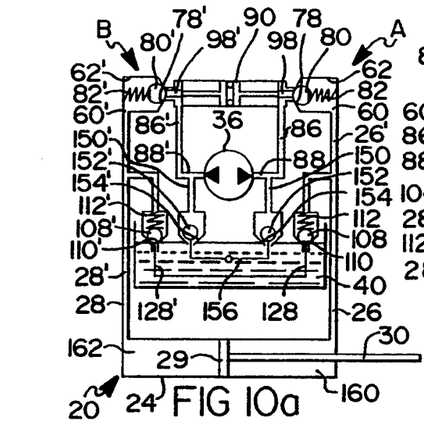
FIG. 10a–10f are schematic views of a hydraulic system for operating the convertible top of FIG. 1 and incorporating a hydraulic locking device and a by-pass device in accordance with this invention, illustrating the sequence of operation of the hydraulic system to raise and lower the convertible top.

Referring now to FIG. 10a, pump 36 is connected by port 88 into a first fluid translating circuit A which includes passage 86, port 84, bore 76, check valve 78, 80, chamber 62, port 60, passage 26', and line 26. This connects pump 36 to the rod ends 160 of cylinders 24.

Pump 36 is similarly connected by port 88' into a second fluid translating circuit B which includes passage 86', port 84', bore 76', circuit valve 78', 80', chamber 62', port 60', passage 28' and line 28. This connects pump 36 to the head ends 162 of cylinders 24.

Figure 10B:
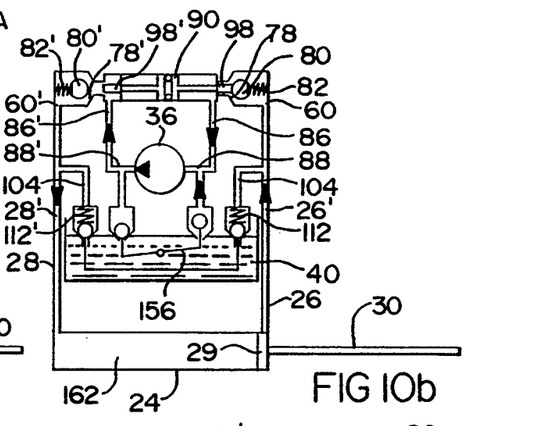

In the FIG. 10a position, the cylinder rod 30 is partially extended, corresponding to a partially lowered (or partially raised) position of top 16. To lower the top from this position, pump 36 is operated to supply pressure fluid through circuit B. As illustrated in FIG. 10b, this action pressurizes port 88' and passages 86', and 150'.

Pressure in passage 86' unseats ball 80' and pressurizes passage 28', line 28 and head-end chamber 162, acting on piston 29 which forces rod 30 to extend, further lowering top 16. Pressure acting on the left side of actuator 90 forces it rightward, unseating ball 80.

Fluid is expelled from rod-end chamber 160 through circuit A. Fluid flows through line 26 and passage 26', past held-open ball 80, and through passage 86 and port 88 into pump 36.

The pressure in passage 150' of circuit B seats ball 152', isolating circuit B from reservoir 40. This pivots rocker 156 to force ball 152 off its seat 154, opening circuit A to reservoir 40. The make-up fluid required to enable cylinder movement is drawn from reservoir 40, past ball 152 and through passage 150 and port 88 into pump 36.

At the end of the top retraction cycle, piston 29 bottoms out on the end of cylinder 24. Release of control switch 23 causes pump 36 to cease operation and pressure equalizes across seat 78', enabling spring 82' to quickly seat ball 80'. This traps pressure fluid in chamber 62' by preventing free fluid backflow through circuit B. As a result, rod 30 is held fully extended, which maintains top 16 in the fully retracted position to facilitate tonneau installation. After pump shutoff, fluid will slowly leak through bypass passage groove 83' and, after one minute, the hydraulic pressure will bleed down to essentially zero. By this time, the vehicle driver will have had sufficient time to install the tonneau.

Figure 10C:
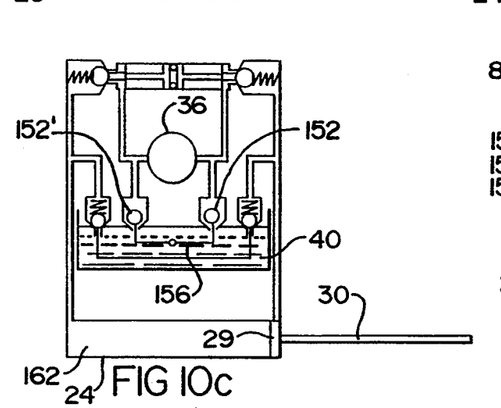

At this time, the hydraulic system will be as illustrated in FIG. 10c, with spring 82 forcing ball 80 to seat by moving the actuator piston 90 to its centered position in circuit A. Rocker 156 is in its neutral position, with both balls 152, 152' unseated.

Figure 10D:
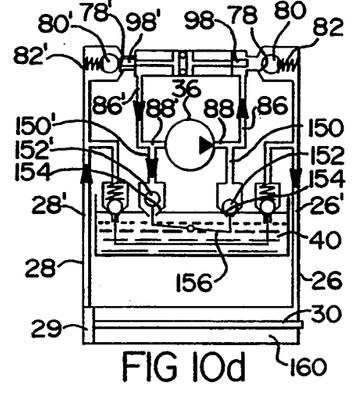

To raise top 16, the tonneau is removed and actuation of the control switch 23 causes pump 36 to pressurize circuit A. As illustrated in FIG. 10d, this action pressurizes port 88 and passages 86 and 150.

Pressure in passage 86 unseats ball 78 and pressurizes passage 26', line 26 and rod-end chamber 160, acting on piston 29 which forces rod 30 to retract, raising top 16. Pressure acting on the right side of actuator 90 forces it leftward, unseating ball 80'. Fluid is expelled from head-end chamber 162 through line 28 and passage 28', past held-open ball 80', and through passage 86' and port 88' into pump 36.

The pressure in passage 150 seats ball 152, isolating circuit A from reservoir 40. This pivots rocker 156 to force ball 152' off its seat 154', opening circuit B to reservoir 40. The excess fluid from head end chamber 162 is dumped into reservoir 40, through port 88 and passage 150, and past ball 152.

At the end of the top raising cycle, piston 29 bottoms out on the end of cylinder 24. Release of control switch 23 stops pump 36 and pressure equalizes across seat 76, enabling spring 82 to quickly seat ball 80. This traps pressure fluid in chamber 62, preventing fluid backflow through circuit A, keeping rod 30 fully retracted. The top linkage is maintained rigid while pressure is maintained in the cylinders. After pump shutoff, fluid will slowly leak through bypass passage groove 83 and, after one minute, the hydraulic pressure will bleed down to essentially zero. By this time, the vehicle driver will have had sufficient time to latch the top in raised position.

This hydraulic depressurization at the end of the top raising and lowering cycles eliminated top linkage rigidity and enables the top linkages to flex with the vehicle as it is driven. Depressurization also prolongs the life of the hydraulic seals and other components by limiting the time when the hydraulic system experiences full pressurization.

Figure 10E:
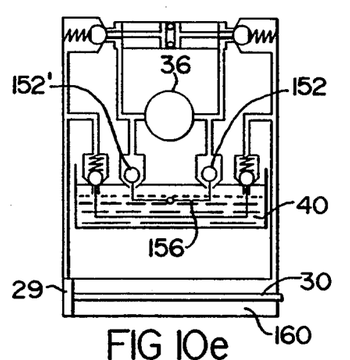

As a result, top 16 is held in the fully raised and extended position, with the top header adjacent the windshield header for a sufficient time to enable header latch operation. At this time, the hydraulic system will be as illustrated in FIG. 10e, with spring 82' forcing ball 80' to seat by moving the actuator 90 to its centered position. Rocker 156 is in its neutral position, with both balls 152, 152' unseated.

Figure 8:
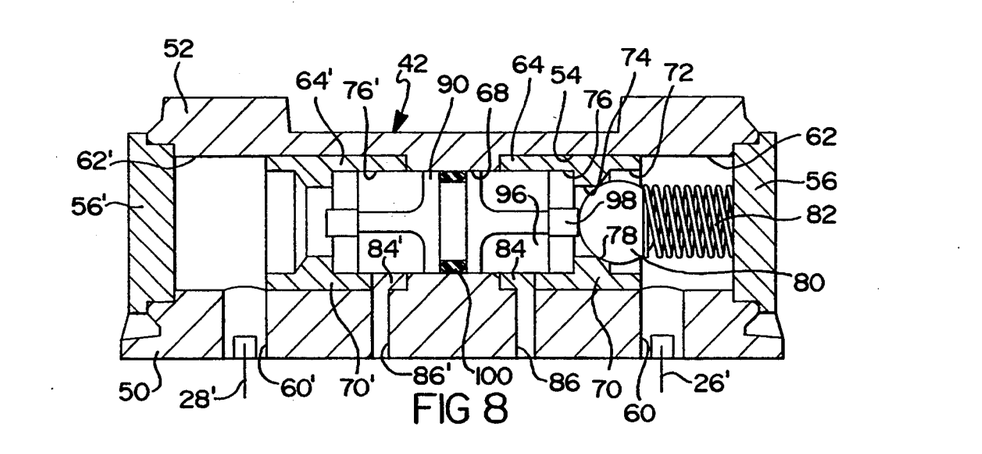
FIG. 8 is a view similar to FIG. 7 showing another embodiment of the hydraulic locking device of this invention.

Referring now to FIG. 8, another embodiment of this invention will be described. In certain cases where space is not a problem, it may not be necessary to hydraulically lock the top in lowered position. In that case both the ball 80' and spring 82' can be omitted from chamber 62' in circuit B. With this arrangement, the operation to raise the top will be as described above. However, upon top lowering, pressure fluid will not be trapped in head-end chamber 162 and fluid backflow will occur directly through circuit B.

The above operation will occur so long as pump 36 is operable. However, should pump 36 or its driving electric motor fail, the top would by essentially hydraulicly locked. Since balls 80, 80' are seated, manual movement could occur at the rate fluid could be forced through bypass grooves 83, 83', which is minimal. This would prevent any practical manual movement, which could otherwise occur if there were no hydraulic lock. Thus, the top could be essentially locked in lowered position with the vehicle subjected to rain, or the top could be essentially locked in an intermediate position, preventing the vehicle from being driven.

Figure 10F:
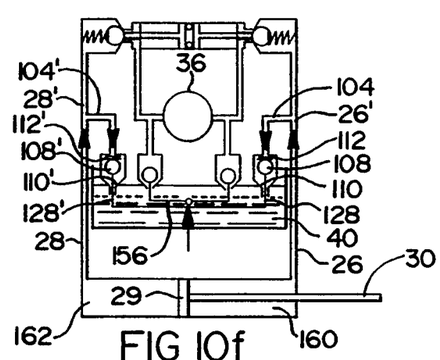

To accommodate such a power loss, the pump bypass described above is provided to enable emergency manual movement. The pump unit is accessed by the driver, who merely flips lever 140 upright, extending from casing end 144. This pulls rod 134 outward, pivoting plate 122 and causing fingers 128, 128' to unseat bypass balls 108, 108', as illustrated in FIG. 10f.

Now, both circuits A and B are open to reservoir 40 through passages 150, 150'. The head ends 162 of cylinders 24 are now in free communication with the rod ends 160 through the reservoir, removing the hydraulic lock. The top may now be manually moved. The flat inner end 163 on lever 140 holds the lever in operated position. This assures that this free communication will continue until lever 140 is purposefully moved back to its inoperative position flat against housing end 144. This enables emergency manual movement of top 16.

Thus, by providing for locking of the hydraulic system, this invention reduces the manual effort required to install the tonneau and/or to operate the header latches. A bypass is provided to unlock the hydraulic system, enabling emergency manual top movement. While only a preferred and alternative embodiments have been illustrated, obvious modifications are contemplated within the scope of this invention and the following claims.

We claim:

1. In a vehicle having a convertible top, a hydraulic actuator for moving the convertible top between extreme raised and lowered positions and having a pair of fluid translating ports, a hydraulic fluid reservoir, and a motor-operated reversible hydraulic pump connected to the reservoir during operation and having a first fluid translating circuit connected to an actuator port for driving the actuator to raise the top and a second fluid translating circuit connected to the other actuator port for driving the actuator to lower the top, an end of cycle locking device comprising a normally-closed first circuit valve in the first circuit that is opened by pressure fluid from the pump to enable outflow of pressure fluid to the actuator in the first circuit during pump operation in one direction, wherein the first circuit valve closes when the pump ceases operation, thus preventing the backflow of fluid through the first circuit to the pump which maintains sufficient hydraulic pressure to hydraulically lock the top in extreme raised position, a leakage bypass across the first circuit valve for permitting the controlled backflow of hydraulic fluid at a predetermined rate from the actuator to the pump to relieve actuator hydraulic pressure to unlock the top after a predetermined period of time, and a first valve actuator for the first circuit valve operable in response to pressure fluid in the second circuit during pump operation in the other direction to open the first circuit valve to enable the return flow of pressure fluid through the first circuit.

2. The locking device of claim 1, wherein the leakage bypass is operative to enable sufficient backflow of hydraulic fluid to relieve hydraulic pressure in the actuator to unlock the top in approximately one minute.

3. The locking device of claim 1, wherein the first circuit valve comprises a seat in the first circuit, a valving member, a spring biasing the valving member into engagement with the seat to close the circuit, and a groove in the valve seat which forms the leakage bypass, and the first actuator comprises a chamber open at one end to the first circuit and at the other end to the second circuit, a piston movable within said chamber and sealing the chamber ends from each other, and a valve operator carried by one end of the piston for unseating the valving member in response to the force exerted on the other end of the piston by pressure fluid in the second circuit, thus enabling the return flow of fluid through the valve seat.

4. The locking device of claim 1, including a second normally-closed circuit valve in the second circuit that is opened by pressure fluid from the pump to enable outflow of pressure fluid to the actuator in the second circuit during pump operation in the other direction, wherein the second circuit valve closes when the pump ceases operation, thus preventing the backflow of fluid to the pump through the second circuit to hydraulically lock the top in extreme lowered position, a second leakage bypass across the second circuit valve for permitting the controlled backflow flow of hydraulic fluid from the actuator to the pump at a predetermined rate to relieve actuator hydraulic pressure to unlock the top after a predetermined period of time, a second valve actuator for the second circuit valve operable in response to pressure fluid in the first circuit during pump operation in the one direction to open the valve to enable the return flow of pressure fluid in the second circuit.

5. The locking device of claim 4, wherein each circuit valve comprises a seat in its circuit, a valving member engageable with the seat to close the circuit, and a groove in each valve seat which forms the leakage bypass, and the valve actuator comprises a chamber open at each end to one of the circuits, a piston movable within said chamber and sealing the chamber ends from each other, and a valve member operator carried by each end of the piston for unseating the valving member in that circuit in response to the force exerted on the other end of the piston by pressure fluid in the other circuit, thus enabling the return flow of fluid through the valve seat.

6. In a vehicle having a convertible top, a hydraulic cylinder for moving the convertible top between extreme raised and lowered positions and having a pair of fluid translating ports, a hydraulic fluid reservoir, and a motor-driven reversible hydraulic pump connected to the reservoir during operation and having a first fluid translating circuit connected to one cylinder port for driving the cylinder to raise the top and a second fluid translating circuit connected to the other cylinder port for driving the cylinder to lower the top, an end of cycle locking device comprising a normally-closed first circuit valve in the first circuit that is opened by pressure fluid from the pump to enable outflow of pressure fluid to the cylinder in the first circuit during pump operation in one direction, wherein the valve closes when the pump ceases operation, thus preventing the backflow of fluid through the first circuit to the pump which locks the top in extreme raised position, a first leakage bypass across the first circuit valve for permitting the controlled backflow flow of hydraulic fluid at a predetermined rate from the actuator to the pump to relieve actuator hydraulic pressure to unlock the top after a predetermined period of time, and a valve actuator for the first circuit valve operable in response to pressure fluid in the second circuit during pump operation in the other direction to open the first circuit valve to enable the free return flow of pressure fluid through the first circuit, a second normally-closed circuit valve in the second circuit that is opened by pressure fluid from the pump to enable outflow of pressure fluid to the cylinder in the second circuit during pump operation in the other direction, wherein the second circuit valve closes when the pump ceases operation, thus preventing the backflow of fluid to the pump through the second circuit to hydraulically lock the top in extreme lowered position, a second leakage bypass across the second circuit valve for permitting the controlled backflow flow of hydraulic fluid at a predetermined rate from the actuator to the pump to relieve actuator hydraulic pressure to unlock the top after a predetermined period of time, and a valve actuator for the second circuit valve operable in response to pressure fluid in the first circuit during pump operation in the one direction to open the valve to enable the free return flow of pressure fluid in the second circuit, a third bypass including a normally-closed bypass valve connecting each circuit to the reservoir, and a manual actuator for opening the bypass valves to permit fluid flow from the second circuit to the reservoir to unlock the top in either extreme position to enable manual movement of the top when the pump is not operating.

7. The locking device of claim 6, wherein each leakage bypass is operative to enable sufficient backflow of hydraulic fluid to relieve hydraulic pressure to unlock the top in approximately one minute.

8. The locking device of claim 6, wherein each circuit valve comprises a seat in its circuit, a valving member, a spring biasing the valving member into engagement with the seat to close that circuit, and a groove in the valve seat which forms the leakage bypass, and each actuator comprises a chamber open at one end to its circuit and at the other end to the other circuit, a piston movable within said chamber and sealing the chamber ends from each other, and a valve operator carried by one end of the piston for unseating the valving member in response to the force exerted on the other end of the piston by pressure fluid in the other circuit, thus enabling the return flow of fluid through the valve seat.

9. The locking device of claim 8, wherein each leakage bypass is operative to enable sufficient backflow of hydraulic fluid to relieve hydraulic pressure to unlock the top in approximately one minute.

10. In a vehicle having a convertible top, top operating means comprising a hydraulic actuator for moving the convertible top between extreme raised and lowered positions and having a pair of fluid translating ports, a hydraulic fluid source including a motor-operated reversible hydraulic pump, and circuitry connecting the pump to both actuator ports and valving for directing hydraulic fluid to one actuator port to pressurize the actuator to raise the top and to the other actuator port to pressurize the actuator to lower the top, characterized by valving including means for maintaining hydraulic pressure in the actuator to hydraulically lock the top in one extreme position, and control means for relieving the hydraulic pressure in the actuator to unlock the top after a predetermined period of time.

11. The top operating means of claim 10, further characterized by the valving including a valve having a valving member seatable on a seat to prevent backflow of hydraulic fluid from the actuator to the pump to maintain the hydraulic pressure in the actuator to maintain the top in the one extreme position, and by the control means comprising a leakage bypass passage which bypasses the valve to allow the backflow of hydraulic fluid from the actuator to the pump at a predetermined rate which relieves hydraulic pressure in the actuator after a predetermined period of time.

12. The top operating means of claim 11, further characterized by the valve being a ball valve and by the leakage bypass passage comprising a groove in the valve seat.

13. The top operating means of claim 10, further characterized by the valving including means for maintaining hydraulic pressure in the actuator to hydraulically lock the top in the other extreme position, and by control means for relieving the hydraulic pressure in the actuator to unlock the top after a predetermined period of time.

14. The top operating means of claim 13, further characterized by the circuitry including first and second circuits connecting the pump to both actuator ports, by the valving including a first valve in the first circuit which has a first valving member seatable on a first seat to prevent backflow of hydraulic fluid from the actuator to the pump to maintain the hydraulic pressure in the actuator to lock the top on the one extreme position, by the control means comprising a first leakage bypass passage which bypasses the first valve to allow the backflow of hydraulic fluid from the actuator to the pump at a predetermined rate which relieves hydraulic pressure in the actuator after a predetermined period of time, by a second valve in the second circuit having a second valving member seatable on a second seat to prevent backflow of hydraulic fluid from the actuator to the pump to maintain the hydraulic pressure in the actuator to lock the top on the one extreme position, and by the control means comprising a second leakage bypass passage which bypasses the second valve to allow the backflow of hydraulic fluid from the actuator to the pump at a predetermined rate which relieves hydraulic pressure in the actuator after a predetermined period of time.

15. The top operating means of claim 14, further characterized by both valves being ball valves and by the leakage bypass passages each comprising a groove in each valve seat.

16. The top operating means of claim 15, further characterized by the valve seat grooves being differently sized to allow backflow of hydraulic fluid from the actuator at different rates for each extreme top position.

17. The top operating means of claim 15, further characterized by the valve seat grooves being sized to relieve actuator hydraulic pressure in approximately one minute.

* * * * *